United States Patent
Tomikura et al.

(10) Patent No.: US 9,843,737 B2
(45) Date of Patent: Dec. 12, 2017

(54) IMAGING DEVICE

(71) Applicant: Panasonic Intellectual Property Management Co., Ltd., Osaka (JP)

(72) Inventors: Yoshihiro Tomikura, Osaka (JP); Nao Kataoka, Osaka (JP); Yuki Sato, Osaka (JP); Shuji Goto, Osaka (JP); Takashi Yamana, Osaka (JP); Hiroyuki Miyahara, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/990,249

(22) Filed: Jan. 7, 2016

(65) Prior Publication Data

US 2016/0219207 A1    Jul. 28, 2016

(30) Foreign Application Priority Data

Jan. 22, 2015  (JP) ................. 2015-010478
Dec. 9, 2015   (JP) ................. 2015-239815

(51) Int. Cl.
*G03B 7/00*   (2014.01)
*H04N 5/238*  (2006.01)
*G03B 9/08*   (2006.01)
*H04N 5/235*  (2006.01)

(52) U.S. Cl.
CPC ................... *H04N 5/2355* (2013.01)

(58) Field of Classification Search
CPC ........ H04N 5/238; H04N 5/235–5/243; H04N 5/353–5/3537; G03B 7/00–7/28; G03B 2207/00–2207/005

USPC .......... 348/362–368; 396/449–451, 213–262
See application file for complete search history.

(56) References Cited

U.S. PATENT DOCUMENTS

| | | |
|---|---|---|
| 5,455,621 A | 10/1995 | Morimura |
| 2004/0228508 A1* | 11/2004 | Shigeta ............. G06K 9/00026 382/124 |
| 2007/0229699 A1* | 10/2007 | Hamamura ........... H04N 5/235 348/362 |

(Continued)

FOREIGN PATENT DOCUMENTS

JP     6-141229    5/1994

*Primary Examiner* — Xi Wang
(74) *Attorney, Agent, or Firm* — Wenderoth, Lind & Ponack, L.L.P.

(57) ABSTRACT

The imaging device comprises: an imaging unit, a shooting processor, an exposure information setter, and an image processor. The imaging unit stores electric charges in response to an incident light for each frame, thereby outputting an image signal. The shooting processor controls storage times, during which the imaging unit stores the electric charges. The exposure information setter sets first exposure control information that controls brightness of a first image signal generated based on a first storage time and second exposure control information that controls brightness of a second image signal generated based on a second storage time. The image processor combines the first and the second image signal. In the case where the first exposure control information satisfies a given condition, the exposure information setter sets the first and the second exposure control information such that storage times corresponding to frames adjacent to each other become equal to each other.

8 Claims, 7 Drawing Sheets

(56) References Cited

U.S. PATENT DOCUMENTS

| | | | |
|---|---|---|---|
| 2012/0050557 A1* | 3/2012 | Atanassov | H04N 5/35581 348/222.1 |
| 2014/0078247 A1* | 3/2014 | Shohara | H04N 9/735 348/38 |
| 2014/0247378 A1* | 9/2014 | Sharma | H04N 5/35536 348/280 |

* cited by examiner

First image signal (Exposure time A)

Second image signal (Exposure time B)
(Exposure time B < Exposure time A)

Composite signal (prior art)

First image signal (Exposure time A)

Second image signal (Exposure time B)
(Exposure time B = Exposure time A)

Composite signal

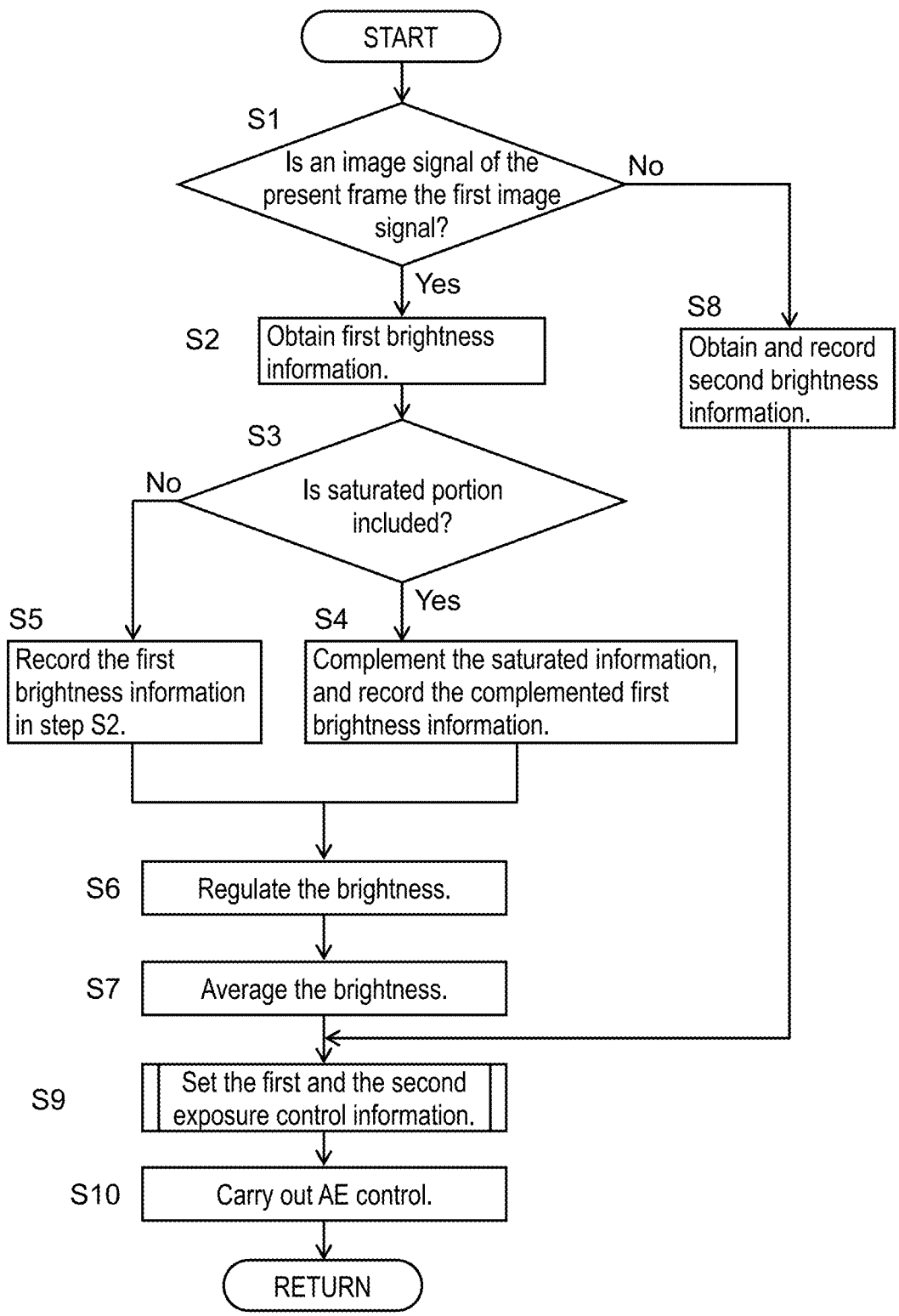

IMAGING DEVICE

BACKGROUND

Technical Field

The present disclosure relates to imaging devices.

Description of Related Art

Some of prior imaging devices are capable of combining multiple image signals obtained by shooting a subject with different exposure times (refer to patent literature 1). This type of imaging device allows combining a first image signal with a second image signal having a smaller exposure than the first image signal, thereby generating a composite signal (composite image) in which a difference in brightness (=contrast) is enlarged.

Patent Literature

PTL 1 Unexamined Japanese Patent Publication No. H06-141229

SUMMARY

A prior imaging device combines a first image signal having a longer exposure time with a second image signal having a shorter exposure time for generating a composite signal. In the case of shooting a moving subject, the first image signal produces an image with blurring, and the second image signal produces a crisp image without blurring. The composite signal is formed of these two images. Although the subject moves smoothly, the crisp image without blurring based on the second image signal appears on the composite signal, thus a composite image sometimes becomes awkward (refer to FIG. 4A).

The present disclosure addresses the problem discussed above, and aims to provide an imaging device capable of generating an unaffected image although the subject moves.

The imaging device disclosed here comprises the following structural elements: an imaging unit, an exposure unit, a shooting processor, an exposure information setter, and an image processor. The imaging unit stores electric charges in response to an incident light for each frame, thereby generating an image signal and outputting the image signal. The exposure unit regulates the incident light into the imaging unit. The shooting processor controls a storage time, during which the imaging unit stores the electric charges such that the storage time includes a first storage time and a second storage time equal to or shorter than the first storage time. The exposure information setter sets first exposure control information that controls brightness of the first image signal generated based on the first storage time and also sets second exposure control information that controls brightness of the second image signal generated based on the second storage time. The image processor combines the first image signal with the second image signal. In the case where the first exposure control information satisfies a given condition, the exposure information setter sets the first exposure control information and the second exposure control information such that electric charge storage times corresponding to frames adjacent to each other on a time base become equal to each other.

The foregoing structure allows the imaging device of the present disclosure to generate an unaffected image although the subject moves.

BRIEF DESCRIPTION OF DRAWINGS

FIG. 5A is a flowchart of an AE process used in the imaging device in accordance with the embodiment.

DETAILED DESCRIPTION OF PREFERRED EMBODIMENT

Structure of Imaging Device

Figure 1:
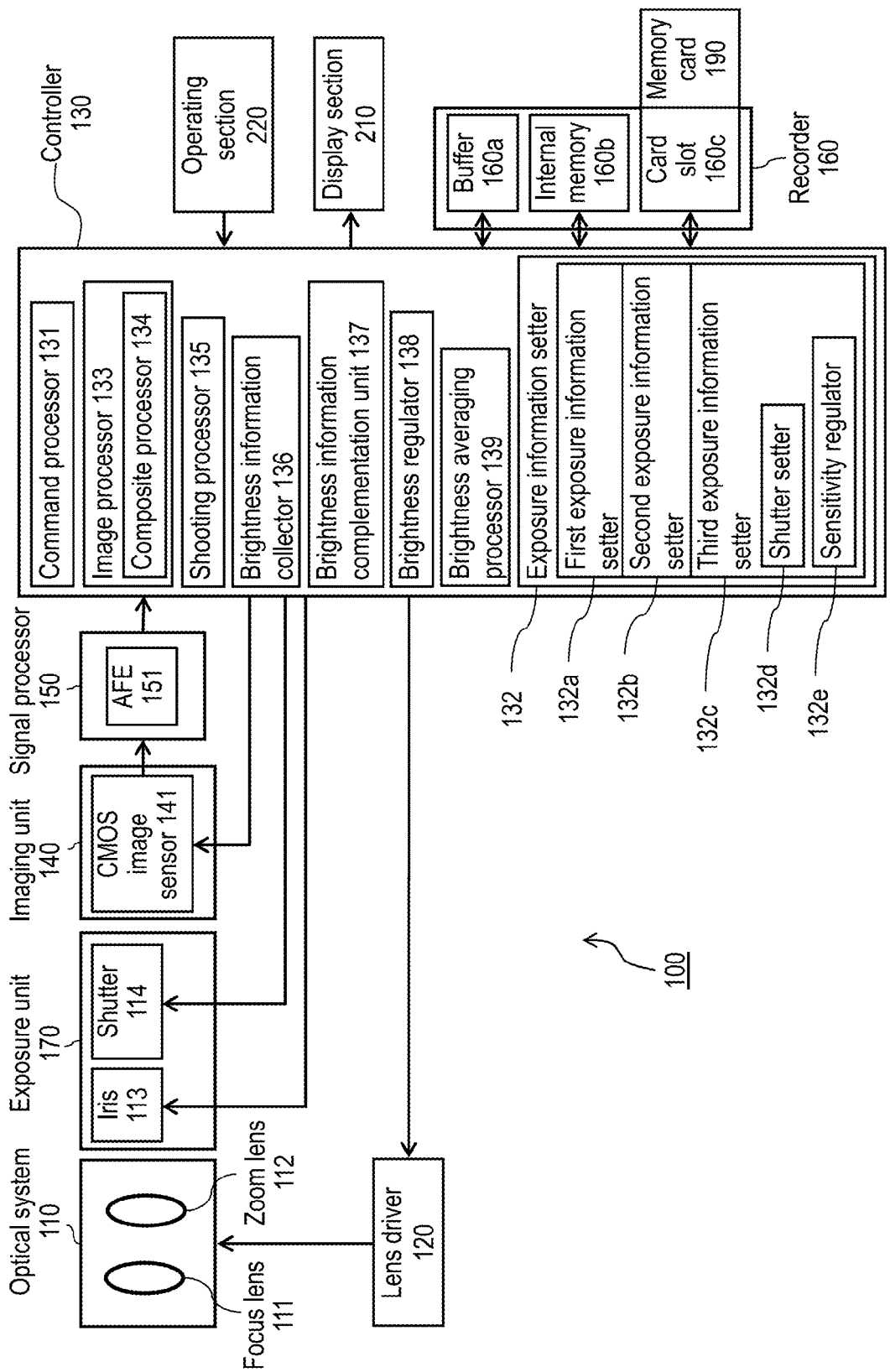
FIG. 1 is a block diagram of an imaging device in accordance with an embodiment of the present disclosure.

FIG. 1 is a block diagram of imaging device 100 in accordance with the embodiment of the present disclosure. Imaging device 100 includes a digital camera or a video camera capable of producing a moving image. In the description below, a digital camera is taken as an example of imaging device 100.

Imaging device 100 includes optical system 110, exposure unit 170, imaging unit 140, signal processor 150, controller 130 lens driver 120, and recorder 160. The term of "signal" used hereinafter expresses a concept including an image, image data, a video, and video data. The term of "information" used hereinafter expresses a concept including information data.

Optical System

Optical system 110 forms an image of a subject, and includes focusing lens 111 and zoom lens 112.

Focusing lens 111 adjusts a focus state of the subject, and zoom lens 112 adjusts an angle of view of the subject. Both of focusing lens 111 and zoom lens 112 are driven by lens driver 120 based on a control signal supplied from controller 130.

Typical lenses are demonstrated hereinbefore; however, optical system 110 can include other lenses necessary for shooting. For instance, it can include an optical camera-shake correcting lens. The lens included in optical system 110 can be formed of multiple lenses or formed of multiple groups of lenses.

Exposure Unit

Exposure unit 170 includes iris 113 and shutter 114. Iris 113 regulates an amount of incident light into imaging unit 140. Shutter 114 regulates an exposure time of the incident light into imaging unit 140. Iris 113 and shutter 114 determine an exposure amount of imaging unit 140. Both of iris 113 and shutter 114 are driven by a driver (not shown) based on a control signal supplied from controller 130.

Imaging Unit

Imaging unit 140 stores the light regulated by exposure unit 170, thereby generating an image signal and outputting it. Imaging unit 140 includes CMOS (Complementary Metal Oxide Semiconductor) image sensor 141 that is an imaging element for shooting a subject image formed by optical system 110. For instance, CMOS image sensor 141 stores light from the subject periodically for generating and outputting the image signal.

Signal Processor

Signal processor 150 includes AFE (Analog Front End) 151 that provides the image signal generated by CMOS image sensor 141 with various processes. To be more specific, the processes AFE 151 provide include a noise reduction through correlated double sampling, an amplification of input range width to an A/D converter by analog-gain controller, and an A/D conversion by the A/D converter.

Controller

Controller 130 controls overall actions of imaging device 100. For instance, controller 130 controls optical system 110 (lens driver 120), exposure unit 170, imaging unit 140, signal processor 150, and recorder 160. Controller 130 also carries out various processes and information recognition (including data recognition) for controlling optical system 110 (lens driver 120), exposure unit 170, imaging unit 140, signal processor 150, and recorder 160.

Controller 130 gives an instruction of AF (Auto Focus) control to optical lens 110 (lens driver 120) based on a state of the subject (e.g. AF control information obtained from the image signal). The AF control information includes, for instance, contrast information. Controller 130 also gives an instruction of AE (Auto Exposure) control to exposure unit 170 based on a state of the subject (e.g. AE control information obtained from the image signal). The AE control information includes, for instance, exposure control information described later.

The foregoing mechanism allows controller 130 to generate the image signal and/or a composite signal (composite image), and stores data, still image data, or moving image data corresponding to these signals in, e.g. memory card 190 and internal memory 160b (hereinafter referred to as a memory unit). Internal memory 160b serves as a second recording section (described later) included in recorder 160. Memory card 190 is attached to a third recording section (card slot 160c) included in recorder 160.

To be more specific, controller 130 is formed of a ROM and a CPU. The ROM stores various programs for controlling overall actions of imaging device 100. These programs include programs about signal control (including composite control), lens-drive control, AF control, AE control, and control overall actions of imaging device 100. The CPU carries out the programs stored in the ROM for executing the foregoing controls. Controller 130 can be formed of a micro-computer that executes the programs, or formed of electronic circuits hard-wired.

Controller 130 includes, for instance, command processor 131, image processor 133, shooting processor 135, brightness information collector 136, brightness information complementation unit 137, brightness regulator 138, brightness averaging processor 139, and exposure information setter 132.

Command processor 131 processes various commands for imaging device 100 to act. For instance, command processor 131 processes the commands given to lens driver 120, exposure unit 170, imaging unit 140, and signal processor 150, and then gives instructions resulting from the processes to these units and the processor. The AF control and/or the AE control are thus executed, whereby an image signal for a still image and/or a composite signal (composite image) for a moving image are produced chiefly in image processor 133.

Image processor 133 provides the image signal output from signal processor 150 with various processes, for instance, provides the image signal shot by using an exposure set in accordance with a subject with various processes that include a smear correction, white-balance correction, gamma correction, a YC conversion process, electronic zooming process, compression process, reduction process, and enlargement process.

Image processor 133 includes composite processor 134 that combines multiple image signals produced by storing electric charges in multiple storage times, and records the resultant signal in recorder 160.

For instance, during a shoot of a moving image, composite processor 134 carries out combining multiple image signals shot at different exposures. This is an example: composite processor 134 combines a first image signal with a second image signal, and records the resultant signal into recorder 160. This composite process allows producing a composite signal (composite image) in which a contrast is enlarged.

As discussed above, the image signal for a still image and/or the composite signal for a moving image, both the signals have been processed in image processor 133, are recordable in a memory as still image data or moving image data.

Figure 2:
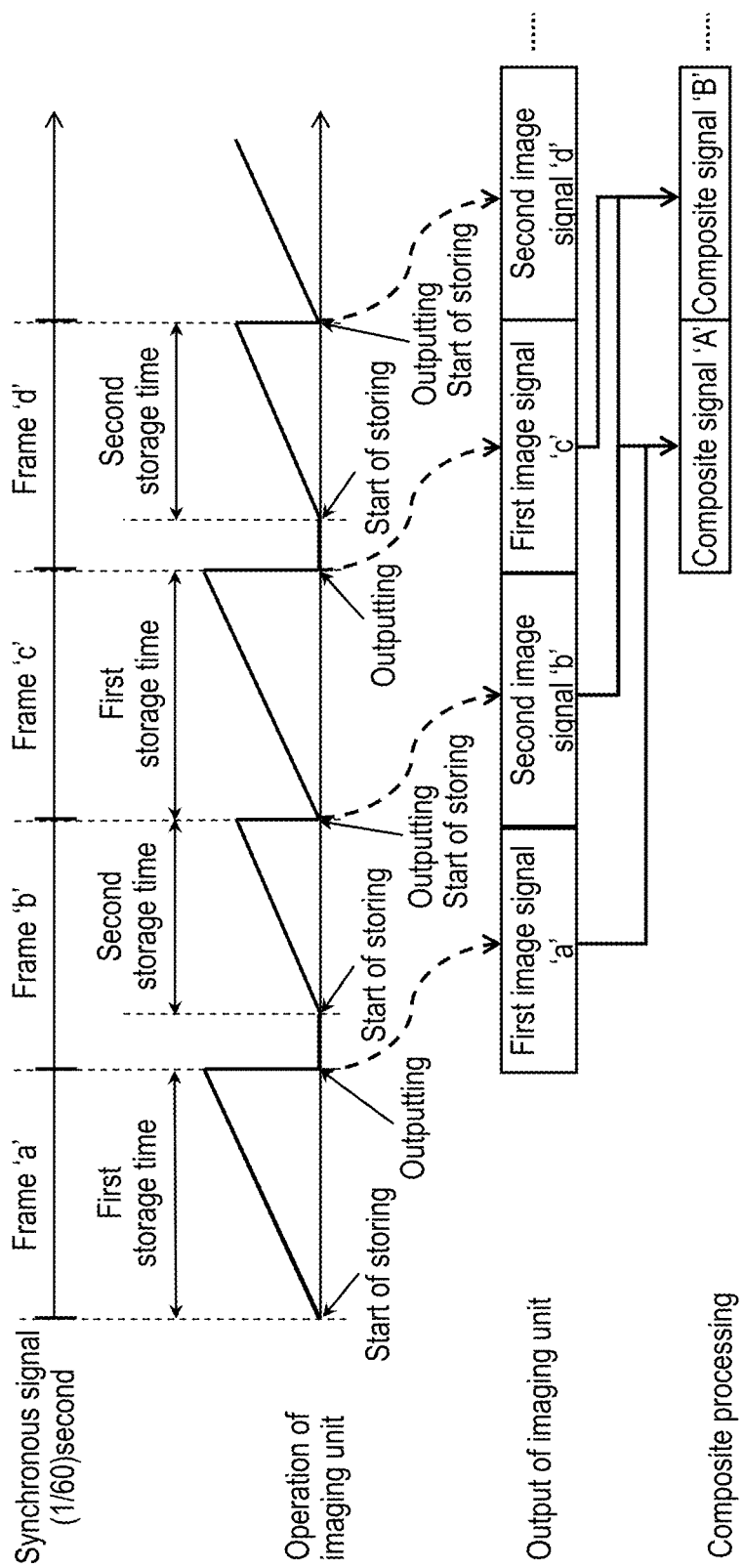
FIG. 2 illustrates schematically operations of the imaging unit in accordance with the embodiment.

Shooting processor 135 controls imaging unit 140 (e.g. CMOS image sensor 141). To be more specific, shooting processor 135 controls a storage time of CMOS image sensor 141 such that the storage time includes multiple storage times each occurring cyclically. The multiple storage times include, for instance, a first storage time and a second storage time. As FIG. 2 shows, shooting processor 135 controls exposure unit 170, whereby the storage time of CMOS image sensor 141 of imaging unit 140 is controlled such that the storage time varies to the first storage time and to the second storage time cyclically. In the first storage time, shooting processor 135 produces the first image signal, and in the second storage time, shooting processor 135 produces the second image signal.

In the example shown in FIG. 2, imaging unit 140 stores light across the frames in the first and the third frames (frame 'a' and frame 'c'), while imaging unit 140 starts storing light halfway in the second and the fourth frames (frame 'b' and frame 'd'), so that the storage times for these frames are shorter than the storage times for the first and the third frames. There are two methods for starting the storage of the light halfway in the frame: one is a mechanical shutter method that blocks the incident light supposed to enter imaging unit 140 during a period (non-storage period) from a start of the frame until the start of storing the light; the other method is an electronic shutter method that resets an image signal, formed of the light stored in the non-storage period, at the start of storing the light (halfway in the frame).

In this embodiment, the first storage time is set equal to or longer than the second storage time. Basically, the first storage time is set longer than the second storage time however, sometimes they are set equal to each other. The storage time of CMOS image sensor 141 refers to a duration during which electric charges are stored in CMOS image sensor 141. In the case where the duration, during which CMOS image sensor 141 stores electric charges, is a duration during which CMOS image sensor 141 is exposed to the light by exposure unit 170, the storage time is equal to the exposure time.

Based on the first image signal and the second image signal produced during the first storage time and the second storage time respectively, brightness information collector 136 collects first brightness information of the first image signal and second brightness information of the second image signal. The first brightness information includes a first brightness level and the second brightness information includes a second brightness level.

Figure 3:
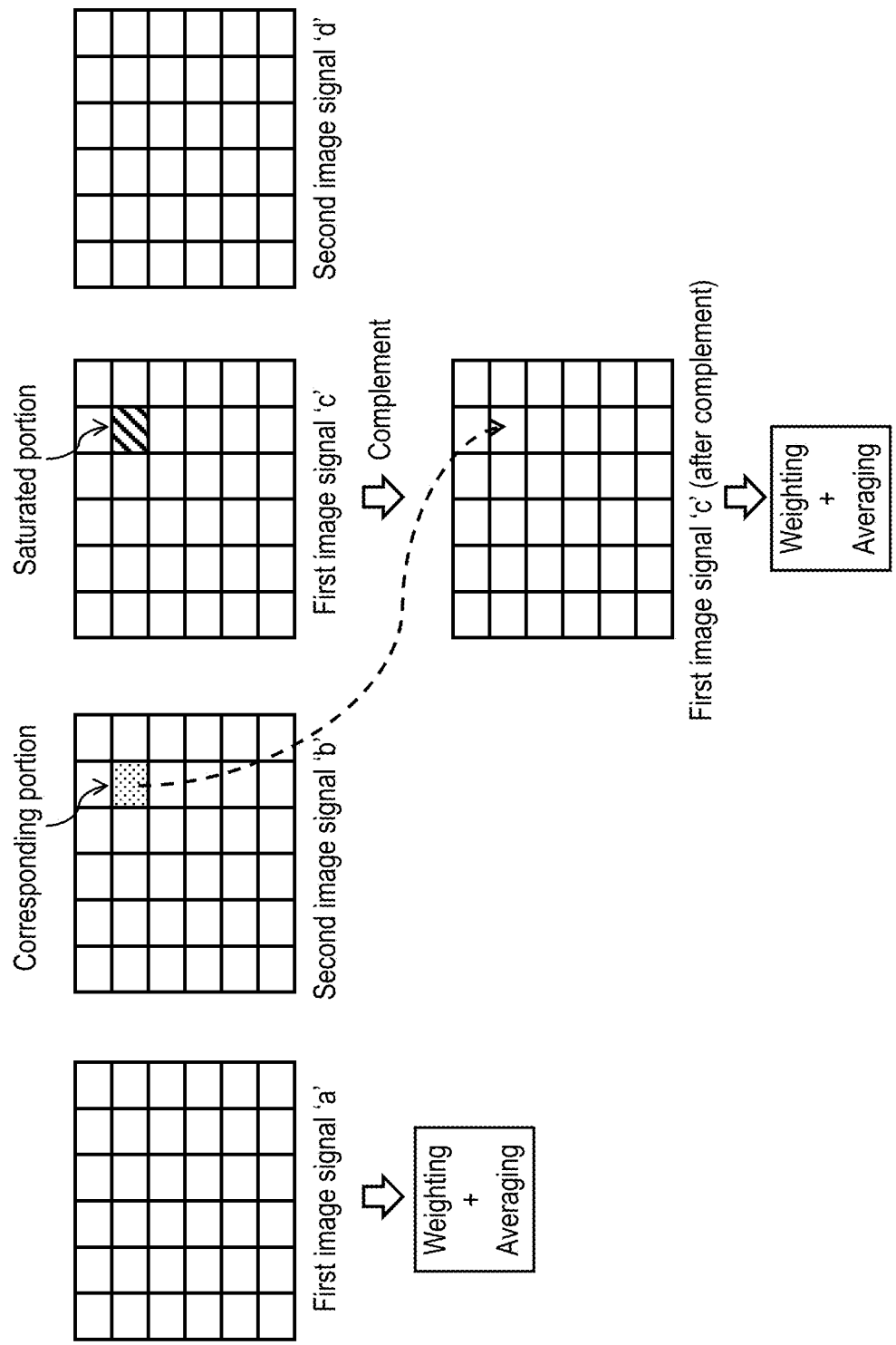
FIG. 3 illustrates schematically a way of brightness complement in accordance with the embodiment.

To be more specific, as FIG. 3 shows, brightness information collector 136 divides the first image signal and the second image signal into multiple parts respectively (e.g. the first image signal is divided into M×N blocks), thereby sensing partial brightness information of each block (first partial brightness information, second partial brightness information). In other words, brightness information collector 136 senses M×N pieces of first partial brightness information, and M×N pieces of second partial brightness information, thereby collecting the first brightness information and the second brightness information. The first brightness information is formed of M×N pieces of first partial brightness information and the second brightness information is formed of M×N pieces of second partial brightness information.

When the first brightness information includes a saturated portion, brightness information complementation unit 137 detects, from the second brightness information, a portion corresponding to the saturated portion in the first brightness information, and complements the saturated portion in the first brightness information by using the second partial brightness information of the corresponding portion.

To be more specific, when at least one of the first partial brightness information is saturated, a portion corresponding to this saturated portion is detected in the second partial brightness information, and use of the second partial brightness information of the corresponding portion allows complementing the first partial brightness information of the saturated portion. In other words, when at least one of the first partial brightness information is saturated, the first partial brightness information of the saturated portion can be complemented with the second partial brightness information of the corresponding portion in the second image signal. In the instance shown in FIG. 3, first image signal 'c' has a saturated portion in the first partial brightness information, and the first partial brightness information of this saturated portion is complemented by the second partial brightness information of corresponding portion of second image signal 'b'. In this context, the term "saturated portion" refers to a portion where an overflow in size occurs in the process of calculating brightness, namely, a maximum brightness portion or a minimum brightness portion. In other words, the brightness becomes maximum or minimum at the saturated portion.

Brightness regulator 138 regulates brightness of the first brightness information having undergone the complementary, or regulates brightness of the first brightness information obtained by brightness information collector 136.

To be more specific, when the first partial brightness information is saturated, brightness regulator 138 provides the first brightness information complemented by brightness information complementation unit 137 with a weighting process. When the first partial brightness information is not saturated, brightness regulator 138 provides the first brightness information collected by brightness information collector 136 with the weighting process. In the instance shown in FIG. 3, first image signal 'a' has a first partial brightness information not saturated, and the first brightness information collected by brightness information collector 136 is provided with the weighting process. First image signal 'c' has saturated portion which a first partial brightness information saturated, and the first brightness information of the first image signal 'c' of which saturated portion has been complemented is provided with the weighting process.

Brightness averaging processor 139 provides a brightness averaging process to the first brightness information having undergone the weighting process done by brightness regulator 138. To be more specific, brightness averaging processor 139 provides the brightness averaging process to multiple pieces (M×N pieces) of first partial brightness information, whereby a representative brightness value (first average brightness) of the first brightness information is calculated.

As FIG. 1 shows, exposure information setter 132 includes first exposure information setter 132a, second exposure information setter 132b, and third exposure information setter 132c.

First exposure information setter 132a sets first exposure control information that controls brightness of the first image signal produced in the first storage time, and second exposure control information that controls brightness of the second image signal produced in the second storage time.

The first exposure control information contains first aperture exposure information, first shutter information, and first sensitivity information. The second exposure control information contains second aperture exposure information, second shutter information, and second sensitivity information. In other words, the first and the second exposure control information are AE control information (AE control value).

The first aperture exposure information and the second aperture exposure information allow controlling iris 113 of exposure unit 170. The first shutter information and the second shutter information allow controlling shutter 114 of exposure unit 170. The first sensitivity information and the second sensitivity information allow controlling CMOS image sensor 141 of imaging unit 140. The first and the second aperture exposure information contain data of exposure amount, the first and the second shutter information contain data of shutter speed, and the first and the second sensitivity information contain gain data.

When the first brightness information includes a saturated portion, first exposure information setter 132a sets the first exposure control information based on the first brightness information complemented. To be more specific, when the first brightness information includes the saturated portion, exposure information setter 132 sets the first exposure control information based on the first brightness information regulated by brightness regulator 138. This action is described more in detail hereinafter. When the first brightness information includes the saturated portion, first exposure information setter 132a sets the first exposure control information based on the first average brightness that has been averaged by brightness averaging processor 139. When the first brightness information does not include the saturated portion, first exposure information setter 132a sets the first exposure control information based on the first brightness information collected by brightness information collector 136. First exposure information setter 132a also sets the second exposure control information based on the second brightness information collected by brightness information collector 136.

Second exposure information setter 132b changes, in response to a variation in brightness of the subject, an amount of variation in the first brightness (an amount of brightness variation for the first brightness information) that changes the brightness of the first brightness information. Then second exposure information setter 132b sets the first exposure control information based on the amount of variation in the first brightness.

To be more specific, second exposure information setter 132b changes the amount of variation in the first brightness in response to the variation in the brightness of the subject, and then sets the amount of variation in the first brightness to equal to or smaller than a given value (equal to or smaller than a threshold). Second exposure information setter 132b changes the first brightness information toward a first brightness target level of the first brightness information based on the amount of variation in the first brightness. Second exposure information setter 132b thus sets the first exposure control information.

For instance, second exposure information setter 132b carries out a convergence calculation, based on the first brightness target level of the first brightness information and the first average brightness of the first brightness information, such that the amount of variation in the first brightness becomes equal to or smaller than the given value. Second exposure information setter 132b then varies the first average brightness of the first brightness information toward the first brightness target level of the first brightness information by using a converged value of the amount of variation in the first brightness. Second exposure information setter 132h thus sets the first exposure control information.

On top of that, second exposure information setter 132b varies the second brightness information based on the amount of variation in the first brightness, thereby setting the second exposure control information. To be more specific, second exposure information setter 132b sets the second exposure control information such that the second brightness information approaches the second brightness target level of the second brightness information based on the amount of variation in the first brightness.

When the first exposure control information satisfies the given condition, third exposure information setter 132c sets the first exposure control information and the second exposure control information such that exposure times of frames adjacent to each other on the time base become equal to each other.

This action is described more in detail hereinafter. Third exposure information setter 132c includes shutter setter 132d and sensitivity regulator 132e. Shutter setter 132d sets first shutter information and second shutter information of the frames adjacent to each other on the time base to equal information when the first shutter information is low-speed information. In other words, the first shutter information and the second shutter information of the frames adjacent to each other on the time base are set equal to each other.

To be more specific, shutter setter 132d set the second shutter information of the present frame to the first shutter information of the previous frame when the first shutter information of the previous frame is low speed information. The low speed info nation refers to that the shutter speed is set to a low speed.

Figure 4A:
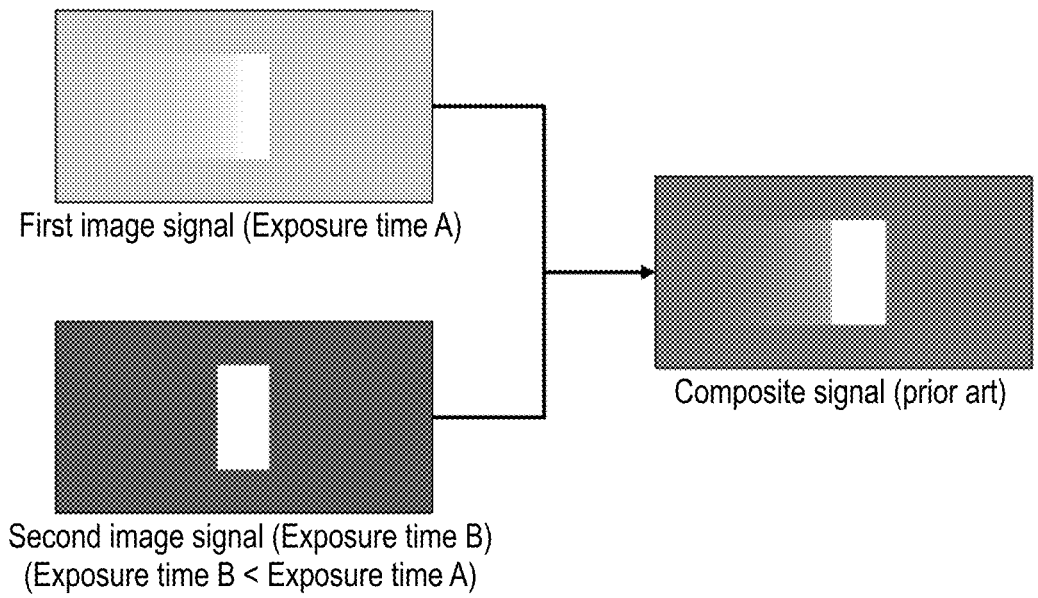
FIG. 4A schematically illustrates a composite signal having undergone a prior AE process.

In the case where the subject is moving, as FIG. 4A shows, age signals are shot at different shutter speeds which cause different exposure times, namely, a first image signal shot with exposure time A and a second image signal shot with exposure time B shorter than exposure time A. These two image signals are combined into a composite signal. In this composite signal (composite image), a blurred image based on the first image signal and a crisp image based on the second image signal and free from blur are superimposed on each other. Although the subject is moving smoothly, the crisp image based on the second image signal and free from blur appears on the composite signal, so that the composite image seems awkward.

Figure 4B:
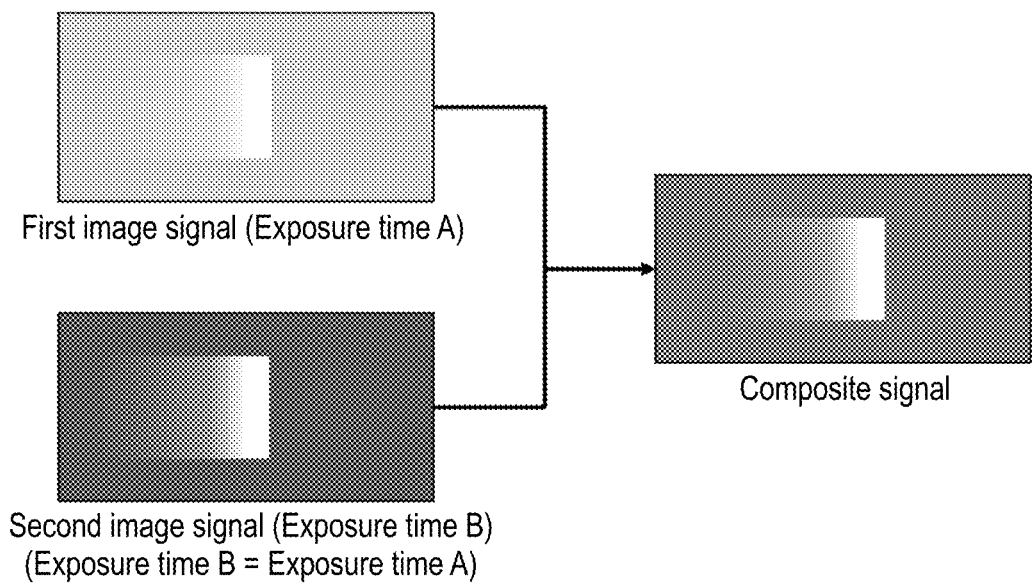
FIG. 4B schematically illustrates a composite signal having undergone an AE process in accordance with the embodiment.

However, when shutter setter 132d sets the first shutter information and the second shutter information to the same information, and on top of that as FIG. 4B shows, exposure time A for the first image signal is set equal to exposure time B for the second image signal, then, the second image signal does not produce a crisp image free from blur although the subject is moving. As a result, a composite signal (composite image) unaffected can be produced.

Sensitivity regulator 132e regulates sensitivity information corresponding to the shutter information set by shutter setter 132d in order to set a brightness level difference between the first image signal and the second image signal. In other words, sensitivity regulator 132e regulates the sensitivity information corresponding to the shutter information set by shutter setter 132d, thereby setting the difference in brightness levels between the first image signal and the second image signal.

For instance, in the case the shutter information set by shutter setter 132d being the second shutter information of the present frame, sensitivity regulator 132e regulates the sensitivity information corresponding to the second shutter information in the second exposure control information of the present frame, thereby setting the difference in the brightness levels between the first image signal and the second image signal.

Lens Driver

As FIG. 1 shows, lens driver 120 drives optical system 110, and is formed of a driving unit such as a DC motor or a stepping motor. Lens driver 120 drives optical system 110 based on a command issued from controller 130, for instance, when lens driver 120 receives AF control information from controller 130 for controlling AF, lens driver 120 drives optical system 110 based on this AF control information. Here is another instance; after a laps of the first storage time, lens driver 120 uses the first image signal produced during the first storage time, thereby driving optical system 110 (e.g. focus lens 111). After a laps of the second storage time, lens driver 120 uses the second image signal produced during the second storage time, thereby driving optical system 110.

Recorder

Recorder 160 includes buffer 160a serving as a first recording section, internal memory 160b serving as a second recording section, and card slot 160c serving as a third recording section. Buffer 160a is a volatile memory medium such as a buffer memory (e.g. DRAM=dynamic random access memory). Buffer 160a functions as a work memory of controller 130 (e.g. image processor 133). Internal memory 160b is a non-volatile memory (e.g. flash memory). Memory card 190 is detachable from card slot 160c and they are connectable together electrically and mechanically. Memory card 190 is an external memory of imaging device 100, and is, for instance, a non-volatile recording medium.

Other Structural Elements

Imaging device 100 includes display unit 210 and operating unit 220. Display unit 210 is, for instance, an LCD monitor or an organic EL monitor. Display unit 210 displays a through-image and a recorded image that are produced by controller 130 (image processor 133). The recorded image is obtained by decoding still image data or moving image data stored in the memory. Operating unit 220 is an operation interface that receives an operation by a user. Operating unit 220 is a general term for operating buttons, operating dials and the like disposed outside imaging device 100. Receiving an operation from a user, operating unit 220 transmits a signal corresponding to an operation to controller 130.

AE Process During a Shoot of a Moving Image

FIG. 2 shows a timing chart in the case of shooting a moving image with imaging device 100. This shooting of the moving image produces a composite signal (composite image), which is then recorded in the memory.

Fundamental actions of producing the composite signal are demonstrated hereinafter with reference to FIG. 2. The shoot of moving images is carried out with a vertical synchronous signal for every given time interval (e.g. 1/60 second per frame). FIG. 2 illustrates that the moving images are shot in the order of frame 'a', frame 'b', and onward. In this case, shooting processor 135 controls exposure unit 170 such that the storage time of imaging unit 140 (CMOS image sensor 141) cyclically changes from the first storage time to/from the second storage time. This control allows imaging unit 140 to produce the first image signal corresponding to the first storage time, and the second image signal corresponding to the second storage time, along the time base cyclically, and then to output these signals. In other words, imaging unit 140 outputs the first image signal at the end of the first storage time, and the second image signal at the end of the second storage time.

Image processor 133 (composite processor 134) of controller 130 then produces a composite signal based on the first and second image signals supplied from imaging unit 140, and records the composite signal as composite image data in the memory. FIG. 2 shows that composite signal 'A' is produced based on first image signal 'a' and second image signal 'b' as well as composite signal 'B' is produced based on second image signal 'b' and first image signal 'c'. As discussed above, the composite signal is sequentially produced based on the first image signal and the second image signal.

During the production of the composite signals as discussed above, an AE process is provided to the first image signals and the second image signals of each frame following the steps below:

First, exposure unit 170 is activated for regulating a light amount and an exposure time for imaging unit 140, so that imaging unit 140 determines the first storage time and the second storage time. Then imaging unit 140 produces the first image signal and the second image signal based on the first or second storage times. This process is carried out for each frame, and the AE process is carried out by using the first and second image signals. Exposure unit 170 is provided with the AE control based on this AE process.

Figure 5B:
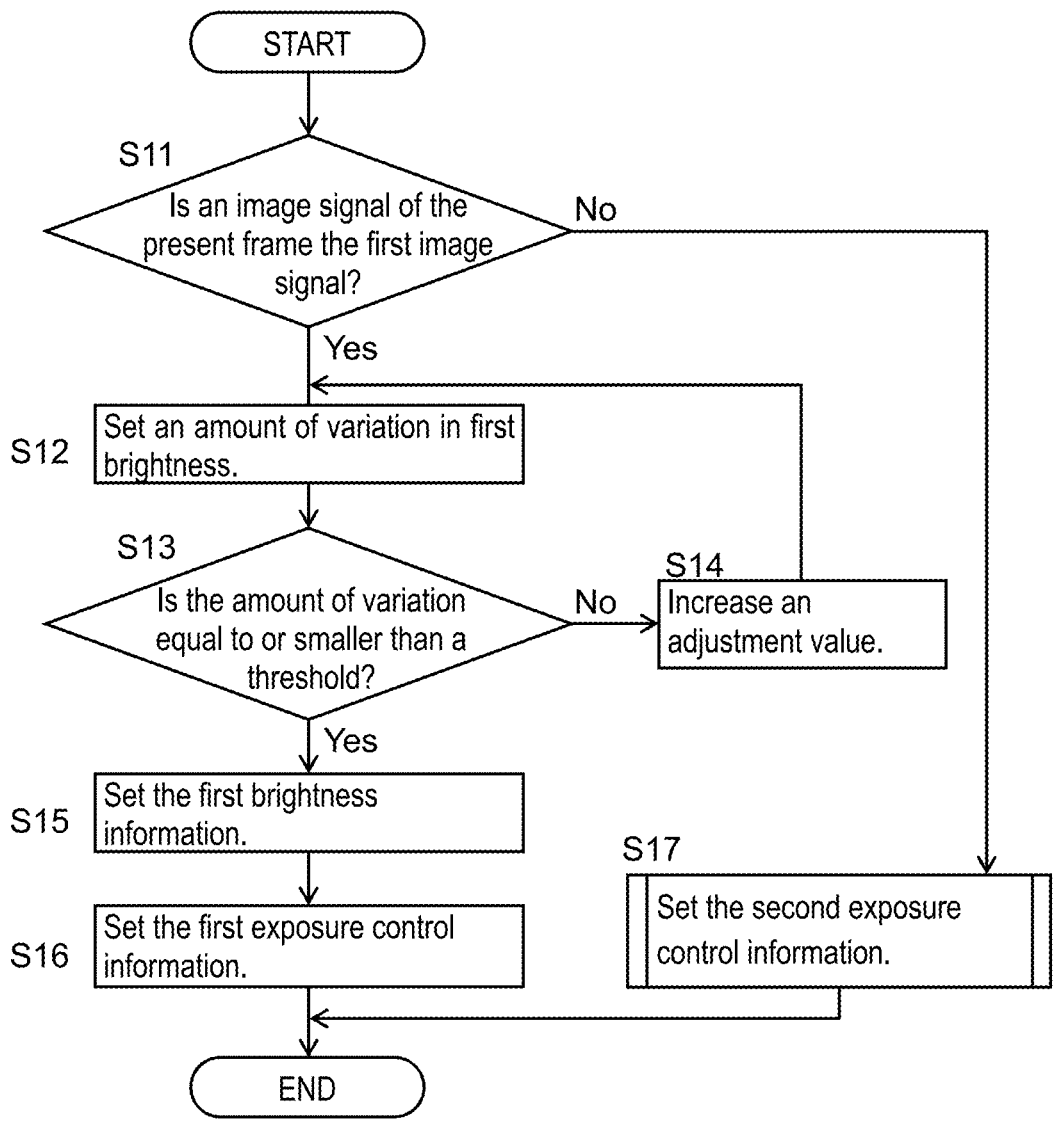
FIG. 5B is a flowchart of an AE process used in the imaging device in accordance with the embodiment.

The foregoing AE process is detailed hereinafter with reference to the flowcharts shown in FIGS. 5A-5C. First, as FIG. 5A shows, it is determined whether or not an image signal of the present frame is the first image signal (step S1). In the case of the image signal of the present frame being the first image signal (branch Yes of step S1), the first brightness information of the first image signal is obtained (step S2). To be more specific, as FIG. 3 shows, the first image signal is divided into M×N blocks, whereby the first partial brightness information of each block is sensed. This detection allows obtaining the first brightness information that is formed of M×N pieces of the first partial brightness information.

Next, it is determined whether or not the first brightness information includes a saturated portion (step S3), namely, whether or not the first brightness information includes saturation information (information indicating brightness of the saturated portion).

In the case of the first brightness information including the saturation information (branch Yes of step S3), second partial brightness information corresponding to the saturated portion of the first brightness information in the present frame is sensed from the second brightness information of the previous frame. Then as FIG. 3 shows, use of the sensed second partial brightness information allows complementing the first partial brightness information of the saturated portion in the first brightness information of the present frame. To be more specific, the second partial brightness information is converted with a given complemental magnification obtained in response to a difference in brightness levels between the first brightness information and the second brightness information. The first partial brightness information is complemented with this converted second partial brightness information. The complemented first partial brightness information (M×N pieces of complemented first partial brightness information) is recorded in the first recording section (buffer 160a) (step S4).

On the other hand, in the case of the first brightness information including no saturated portion (branch No of step S3), the first brightness information (M×N pieces of the first partial brightness information) of the present frame is recorded in the first recording section (buffer 160a) (step S5).

Then brightness regulator 138 provides the first brightness information recorded in the first recording section with a brightness regulating process. To be more specific, a weighting process is provided to M×N pieces of the first partial brightness information. In other words, M×N pieces of the first partial brightness information is weighted with a magnification calculated by using a given weighting function (step S6).

Next, brightness averaging processor 139 provides the weighted first brightness information with a brightness averaging process (step S7). To be more specific, M×N pieces of the first partial brightness information undergo the averaging process, whereby a representative brightness value (an average of the first brightness) of the first brightness information of the present frame is calculated. This representative brightness value is recorded in the first recording section.

In step S1, when the image signal of the present frame is the second image signal (branch No of step S1), the second brightness information of the second image signal is obtained (step S8). This second brightness information is recorded in the first recording section as brightness information of the present frame. The second brightness information in step S8 can be obtained in the same way as is done in step S2, so that the description thereof is omitted here.

Next, based on the first brightness information or the second brightness information, first exposure control information or second exposure control information (AE control information) is set (step S9). Then the AE control is carried out based on the first exposure control information or the second exposure control information (AE control information) (step S10).

The process carried out in step S9 is demonstrated hereinafter. First, the process is outlined. In the case of the image signal of the present frame being the first image signal, the first exposure control information is set based on the first average brightness of the first brightness information (M×N pieces of the first partial brightness information) that has been averaged in step S7 shown in FIG. 5A. On the other hands, in the case of the image signal of the present frame being the second image signal, the second exposure control information is set based on the second brightness information (M×N pieces of the second partial brightness information) obtained in step S8.

The process carried out in step S9 shown in FIG. 5A is detailed with reference to FIG. 5B. It is determines whether or not the image signal of the present frame is the first image signal (step S11). Meanwhile controller 130 has already recognized whether or not the image signal of the present frame is the first image signal in step S1 shown in FIG. 5A, so that the determination in step S11 is not necessarily; however, in order to make the description more understandable, the same process as what is done in step S1 is described in step S11.

In the case of the image signal of the present frame being the first image signal (branch Yes of step S11), an amount of variation in first brightness is set based on the first average brightness and the first brightness target level calculated in step S7 shown in FIG. 5A (step S12). To be more specific, a brightness level difference is set based on the first average brightness and the first brightness target level, and the resultant brightness level difference is divided by an adjustment value (=brightness level difference/adjustment value), whereby the amount of variation in the first brightness is set. The adjustment value is used for adjusting a size of brightness level difference.

Then it is determined whether or not the amount of variation in the first brightness is equal to or smaller than an upper limit value of varying the brightness (step S13). In the case of this amount of variation being greater than the upper limit value (branch No of step S13), the adjustment value is increased (step S14). Based on the increased adjustment value, the process in step S12 is carried out. The processes in steps S13 and S14 undergo convergence calculations until the amount of variation in the first brightness becomes equal to or smaller than the upper limit value.

In the case of the amount of variation in the first brightness being equal to or smaller than the upper limit value (branch Yes of step S13), the first brightness information is varied toward the first brightness target level based on the amount of variation in the first brightness, thereby setting the first brightness information of the frame ahead of the present frame by two frames (step S15). Based on this first brightness information, the first exposure control information (first aperture exposure information, first shutter information, first sensitivity information) of the frame ahead of the present frame by two frames is set (step S16). Based on this first exposure control information, the AE control discussed previously is carried out (step S10 in FIG. 5A).

The process in step S16 is detailed hereinafter. In the case of the first brightness information obtained from the first image signal being lower than the first brightness target level, the first shutter information is set to low-speed information (a shutter speed is set slower) or the first sensitivity information is set to high-sensitivity information (raise a gain). This setting allows the first exposure control information to be set such that the brightness information becomes higher before the next brightness information is obtained.

In the case of the first brightness information obtained from the first image signal being higher than the first brightness target level, the first shutter information is set to high-speed information (a shutter speed is set faster) or the first sensitivity information is set to low-sensitivity information (decrease a gain). This setting allows the first exposure control information to be set such that the brightness information becomes lower before the next brightness information is obtained. An amount of variation in the first shutter information, and an amount of variation the first sensitivity information are adjusted for each frame such that the first brightness information approaches gradually the first brightness target level.

On the other hand, in the case of the present frame being the second image signal (branch No of step S11), the second exposure control information is set (step S17).

The process in step S17 is detailed hereinafter with reference to FIG. 5C. It is determined whether or not the first shutter information in the first exposure control information of the previous frame is low-speed information (step S18). In the case of this first shutter information being low-speed information (branch Yes of step S18), the first shutter information of the previous frame is set as the second shutter information of the present frame (step S19).

In order to set a difference in brightness levels between the first image signal and the second image signal, the second sensitivity information corresponding to the second shutter information is adjusted (step S20). To be more specific, the adjustment of gain of the second sensitivity information corresponding to the second shutter information allows setting the difference in brightness levels between the first and the second image signals. Since it is difficult for exposure unit 170 to follow the adjustments every one frame (1/60 second), the second aperture exposure information is set to a given exposure amount based on the second shutter information.

The second brightness information, the second sensitivity information, and the second aperture exposure information are set as discussed above, whereby the second exposure control information of the frame ahead of the present frame by two frames is set (step S21). Then the AE control is carried out based on the second exposure control information (step S10 in FIG. 5A).

In the case of the first shutter information of the previous frame being not low-speed information (branch No of step S18), the second exposure control information is set based on the amount of variation in the first brightness of the first image signal of the previous frame (step S22). To be more specific, based on the amount of variation in the first brightness of the first image signal of the previous frame, the second sensitivity information is set such that the second brightness information of the present frame can approach the second brightness target level of the second brightness information, so that the second sensitivity information is set to the second exposure control information of the frame ahead of the present frame by two frames.

To be more in detail, based on the amount of variation in the first brightness of the first image signal of the previous frame, an amount of variation in the second brightness of the present frame is set. The amount of variation in the second brightness is used for varying the brightness of the second brightness information. Based on the amount of variation in the second brightness, the second brightness information of the frame ahead of the present frame by two frames is set such that the second brightness information can approach the second brightness target level. The second brightness target level makes the difference in brightness levels between the first brightness information and the second brightness information stay constant. The second brightness information is set as discussed above, then based on this second brightness information, the second exposure control information of the frame ahead of the present frame by two frames is set. Then based on this second exposure control information, the AE control discussed previously is carried out (step S10 in FIG. 5A).

The foregoing AE process, as shown in FIG. 3 and FIG. 5A, a saturation of the first brightness information can be complemented by the second brightness information, so that the AE control can be carried out by the brightness information free from shortage. In other words, a shortage of brightness is appropriately evaluated before the AE control is carried out.

The foregoing AE process varies the brightness information in response to a variation in brightness of the subject. For instance, as described in FIG. 5B, based on the difference in brightness levels, an amount of variation in the brightness is set to be equal to or smaller than the threshold, and then the brightness is varied based on the set amount in variation of the brightness. This mechanism allows varying the brightness information gently when the difference in the brightness levels is great. In other words, in the case of greater difference in brightness levels, images of which brightness varies unaffectedly can be produced.

Figure 5C:
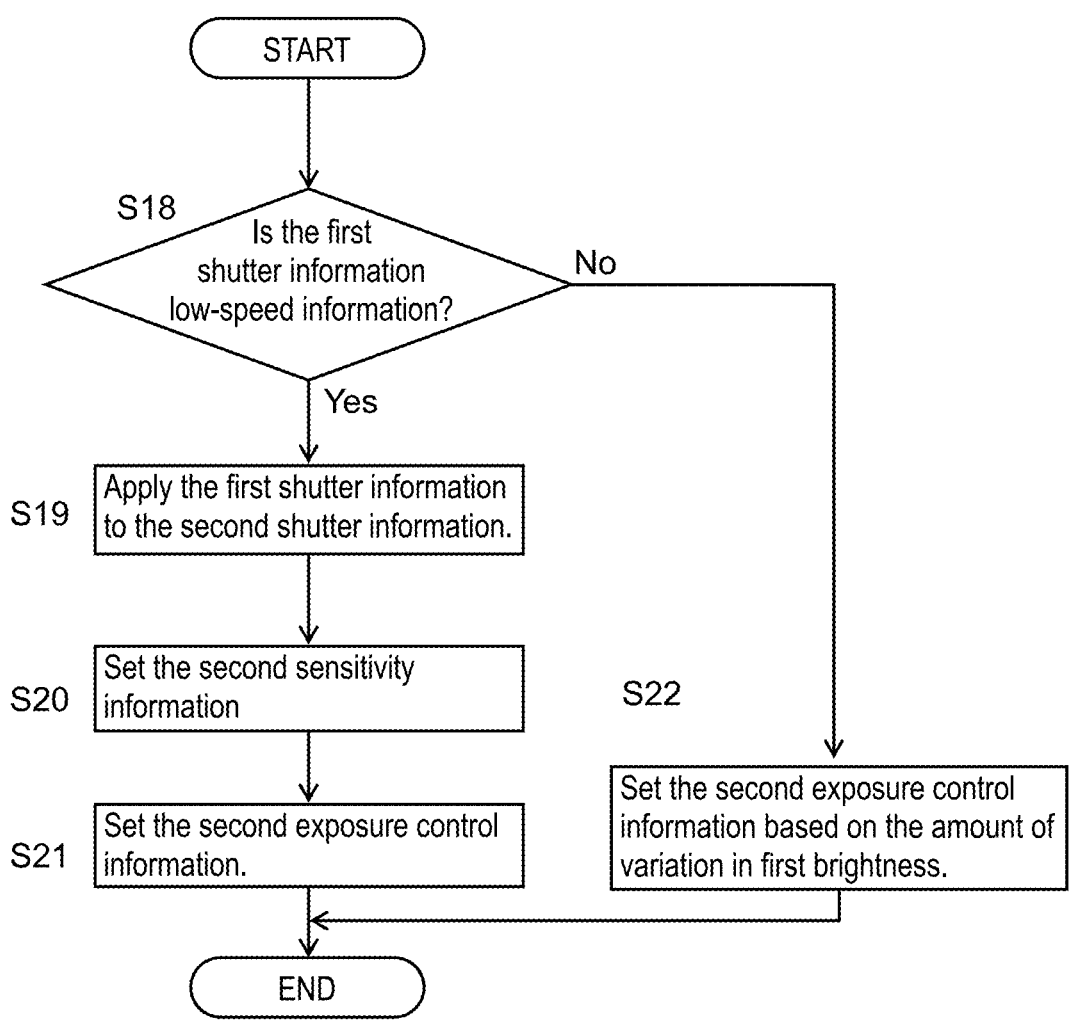
FIG. 5C is a flowchart of an AE process used in the imaging device in accordance with the embodiment.

On top of that, as FIG. 4B and FIG. 5C show, in the case of the first exposure control information satisfying a given condition, the foregoing AE process applies the first shutter information to the second shutter information when, for instance, the first shutter information includes the low-speed information. This mechanism allows regulating a difference in blurs caused by difference in shutter speeds of images between the first image signal and the second image signal, so that an unaffected composite signal (composite age) can be produced.

Other Embodiments

The present disclosure is not limited to the embodiments discussed above, but it can be modified or amended as long as the gist of the present disclosure is maintained.

(a) In the foregoing embodiments, image processor 133 is included in controller 130; however, image processor 133 can be independent of controller 130.

(b) In the foregoing embodiments, structures necessary for describing the features of the present disclosure are demonstrated; however, other structures not described hitherto but necessary for operating imaging device 100 have constructions similar to those of prior art. In other words, the other structures omitted here are similar to those of the prior art.

(c) In the foregoing embodiments, in the case of the first brightness information including saturated information, the first exposure control information is set based on the representative value of the first brightness information. However, instead of this process, the first exposure control information can be set based on the first brightness information complemented in step S4 shown in FIG. 5A.

(d) In the foregoing embodiments, in the case of the first brightness information including saturated information, the first exposure control information is set based on the representative value of the first brightness information. However, instead of this process, the first exposure control information can be set based on the first brightness information adjusted in step S6 shown in FIG. 5A.

What is claimed is:

1. An imaging device comprising:
    an imaging unit that stores electric charges for every frame in response to incident light into the imaging unit for producing and outputting a first image signal and a second image signal corresponding to the frames adjacent to each other on a time base;
    an exposure unit for regulating the incident light into the imaging unit;
    a shooting processor for controlling a storage time, during which the imaging unit stores the electric charges, such that the storage time includes a first storage time and a second storage time equal to or shorter than the first storage time;
    an exposure information setter for setting first exposure control information that controls a brightness level of the first image signal produced in the first storage time, and also setting second exposure control information that controls a brightness of the second image signal produced in the second storage time, such that the brightness level of a first image signal and the brightness level of a second image signal are different; and
    an image processor for combining the first image signal with the second image signal,
    wherein when the first exposure control information satisfies a predetermined condition, the exposure information setter sets the second exposure control information such that the first storage time and the second storage time become equal.

2. The imaging device according to claim 1, wherein each of the first exposure control information and the second exposure control information includes shutter information, and the exposure information setter includes a shutter setter that sets the shutter information, and
    wherein when the shutter information of the first exposure control information is low-speed information indicating a low shutter-speed as the predetermined condition, the shutter setter sets the shutter information of the first exposure control information and the second exposure control information corresponding to the frames adjacent to each other on the time base to identical information with each other.

3. The imaging device according to claim 2, wherein when the shutter information of the first exposure control information is the low-speed information, the shutter setter sets the shutter information of the second exposure control information to the shutter information of the first exposure control information.

4. The imaging device according to claim 2, wherein each of the first exposure control information and the second exposure control information further includes sensitivity information, and wherein the exposure information setter further includes a sensitivity regulator that regulates the sensitivity information corresponding to the shutter information set by the shutter setter in order to set a difference in brightness levels between the first image signal and the second image signal.

5. The imaging device according to claim 4, wherein when the shutter information of the first exposure control information is the low-speed information, the shutter setter sets the shutter information of the second exposure control information to the shutter information of the first exposure control information, and wherein the sensitivity regulator regulates the sensitivity information corresponding to the shutter information in the second exposure control information in order to set the difference in the brightness levels.

6. The imaging device according to claim 1, further comprising:
    a brightness information collector for dividing the first image signal and the second image signal into multiple parts respectively, and sensing first partial brightness information and second partial brightness information is formed of partial brightness information of each part, and
    a brightness information complementation unit for complementing a saturated part in the first partial brightness information by using the second partial brightness information of a part corresponding to the saturated part when the first partial brightness information includes the saturated portion.

7. The imaging device according to claim 1, wherein the brightness level of the first image signal is varied toward a first brightness target level based on an amount of variation having an upper limit value.

8. The imaging device according to claim 1, wherein the image processor combines the first image signal with the second image signal to produces a composite image in which a contrast is enlarged.

* * * * *